United States Patent [19]

Jolissaint et al.

[11] Patent Number: 5,455,903
[45] Date of Patent: Oct. 3, 1995

[54] OBJECT ORIENTED CUSTOMER INFORMATION EXCHANGE SYSTEM AND METHOD

[75] Inventors: Charles H. Jolissaint, Sunnyvale; Elliott B. Shem, Santa Clara; Sunny McRae, Fremont; Kenneth E. Waln, San Jose; John E. Duffy, Milpitas, all of Calif.

[73] Assignee: Edify Corp., Santa Clara, Calif.

[21] Appl. No.: 708,463

[22] Filed: May 31, 1991

[51] Int. Cl.⁶ ............................................ G06F 15/62
[52] U.S. Cl. ................................. 395/155; 395/159
[58] Field of Search ........................... 395/155–161, 395/600, 500, 575, 650

[56] References Cited

U.S. PATENT DOCUMENTS

| | | |
|---|---|---|
| 4,580,012 | 4/1986 | Matthews et al. . |
| 4,580,016 | 4/1986 | Williamson . |
| 4,581,486 | 4/1986 | Matthews et al. . |
| 4,585,906 | 4/1986 | Matthews et al. . |
| 4,602,129 | 7/1986 | Matthews et al. . |
| 4,640,991 | 2/1987 | Matthews et al. . |
| 4,652,700 | 3/1987 | Matthews et al. . |
| 4,757,525 | 7/1988 | Matthews et al. . |
| 4,761,807 | 8/1988 | Matthews et al. . |
| 4,901,221 | 2/1990 | Kodosky et al. ................... 395/161 |
| 4,918,722 | 4/1990 | Duehren et al. ................... 379/100 |
| 4,926,462 | 5/1990 | Ladd et al. |
| 4,939,507 | 7/1990 | Beard et al. ....................... 359/159 |
| 4,962,472 | 10/1990 | Seki et al. ......................... 395/161 |
| 5,040,131 | 8/1991 | Torres ............................... 395/157 |
| 5,125,091 | 6/1992 | Staas et al. ....................... 395/650 |
| 5,168,441 | 12/1992 | Onarheim et al. ................. 364/146 |
| 5,182,793 | 1/1993 | Alexander et al. ................ 395/13 |
| 5,214,756 | 5/1993 | Franklin et al. ................... 395/161 |
| 5,255,363 | 10/1993 | Seyler ................................ 395/159 |

FOREIGN PATENT DOCUMENTS 8807719  10/1988  European Pat. Off. .

OTHER PUBLICATIONS

"Computer Dictionary", Microsoft Press, Second Edition, Copyright 1994, p. 276.

"Visual Programming", Nan C. Shu, 1988, pp. 190–237.

SpectraFAX Corp., We're Making Headlines with the Marriage of the Century, undated.

Wojno, J., et al., While-You-Wait Fax, Newsweek, undated (reprint).

Dreyfuss, J., Getting High Tech Back on Track, Fortune, 5(?)/Jan. 1990 (reprint).

Depke D. (ed.). An Answering Machine that Really gives Answers, BusinessWeek, Oct. 9, 1989.

SpectraFAX Corp., Special Request . . . Sep. 1, 1989 pp. 3–14.

Anon., Voice Processing Newsletter, May 21, 1990, pp. 1–2, The Record of the Voice Processing Industries Probe Research, Inc.

Anon., VoiceNews, May 1990, p. 8.

*Primary Examiner*—Mark R. Powell
*Assistant Examiner*—Huynh Ba
*Attorney, Agent, or Firm*—Stuart P. Meyer; Robert P. Sabath

[57] ABSTRACT

A computer-based information exchange system permits customers to request and receive different types of information from various sources. The operation of the system is controlled by an application created using object oriented techniques. These techniques permit simple and straightforward creation and modification of complex automation tasks involving numerous action-object pairs.

11 Claims, 13 Drawing Sheets

OBJECT ORIENTED CUSTOMER INFORMATION EXCHANGE SYSTEM AND METHOD

BACKGROUND OF THE INVENTION

This invention relates generally to systems for automating common business communications tasks and more particularly to a system for designing computer applications for automating customer access to information in corporate databases.

The efficient exchange of information with customers is crucial to the success of most businesses. The prior art includes a number of systems by which businesses can improve communication with customers. Toll-free telephone numbers, automated call routing systems, computer bulletin boards and facsimile communication facilities all facilitate such information interchange. More recent prior art systems such as disclosed in U.S. Pat. No. 4,918,722 permit users to obtain access to information stored in various formats through telephone connections.

As the communication channels between a business and its customers increase in availability, however, the sheer amount of information available to customers can itself become an impediment to efficient information interchange. While call routing systems and the like provide rudimentary menus to help organize communication, more sophisticated means are required to handle greater information flow. To provide flexibility in the operation of such systems, an "application" may be employed to direct the interplay among the various components of the system. Each business using such a system has slightly different requirements. Therefore, the application controlling system operation should be designed specifically to meet the needs of the business that will be using the system. As the number of manipulations and devices controlled by the system increases, it becomes extraordinarily difficult to custom-design applications for particular businesses, or to make changes to existing applications as the business grows or its needs change. By implementing applications in programmed computers, some flexibility is gained, and functionality can be changed without physical alteration of the system. Conventional object-oriented techniques permit changes to be made yet more easily. Object oriented systems have been employed in the prior art to develop user interfaces or unique programs, but object-oriented approaches are not known to have been successfully used in the prior art to provide such organizational capability for a customer information exchange system, nor could conventional object oriented approaches present a complete solution. Moreover, the use of actions operating on selected objects achieves a manageable number of choices in the system. Otherwise, the availability of M information sources, each with N possible activities, can quickly produce an unmanageable permutation of possible design choices as M and N increase.

SUMMARY OF THE INVENTION

In accordance with the present invention, a computer-based object oriented system is used to create simple, straightforward applications that provide access to a wide variety of corporate data sources. In accordance with the present invention, a central processing unit is programmed to provide an application designer with a simple, intuitive user interface for creating applications. To reduce the number of choices among which a designer of a particular application must select for the efficient exchange of corporate and customer information, the system presents the application designer with a two-stage selection process. In the first stage, the designer selects a particular action, such as a "request." In the second stage, the designer selects the object that is to be acted upon, such as a "telephone." Using this technique, the designer is presented with only N+ M choices for available activities and sources ("steps") rather than being presented with N*M choices for the same steps listed as combined actions and objects.

In accordance with the present invention, the system presents the application designer with a hybrid layout of the designer's chosen steps, combining elements of decision tree and process flow displays under a hierarchical structure in a manner that does not include any confusing feedback paths.

Also in accordance with the present invention, the designer can add, delete or manipulate steps on the display simply by dragging the desired steps to various locations on a display grid that provides easy reference for display and forwarding activity from one cell to another.

In accordance with the present invention, objects can be created that register themselves with an applications generator to facilitating straightforward design of custom applications to control the workflow of a customer information exchange system; objects can be trained to perform particular manipulations; objects can be invoked during debugging to verify that they are properly receiving, processing and transmitting data; and objects can automatically execute their specified functions when called upon to do so.

DESCRIPTION OF THE PREFERRED EMBODIMENT

Figure 1:
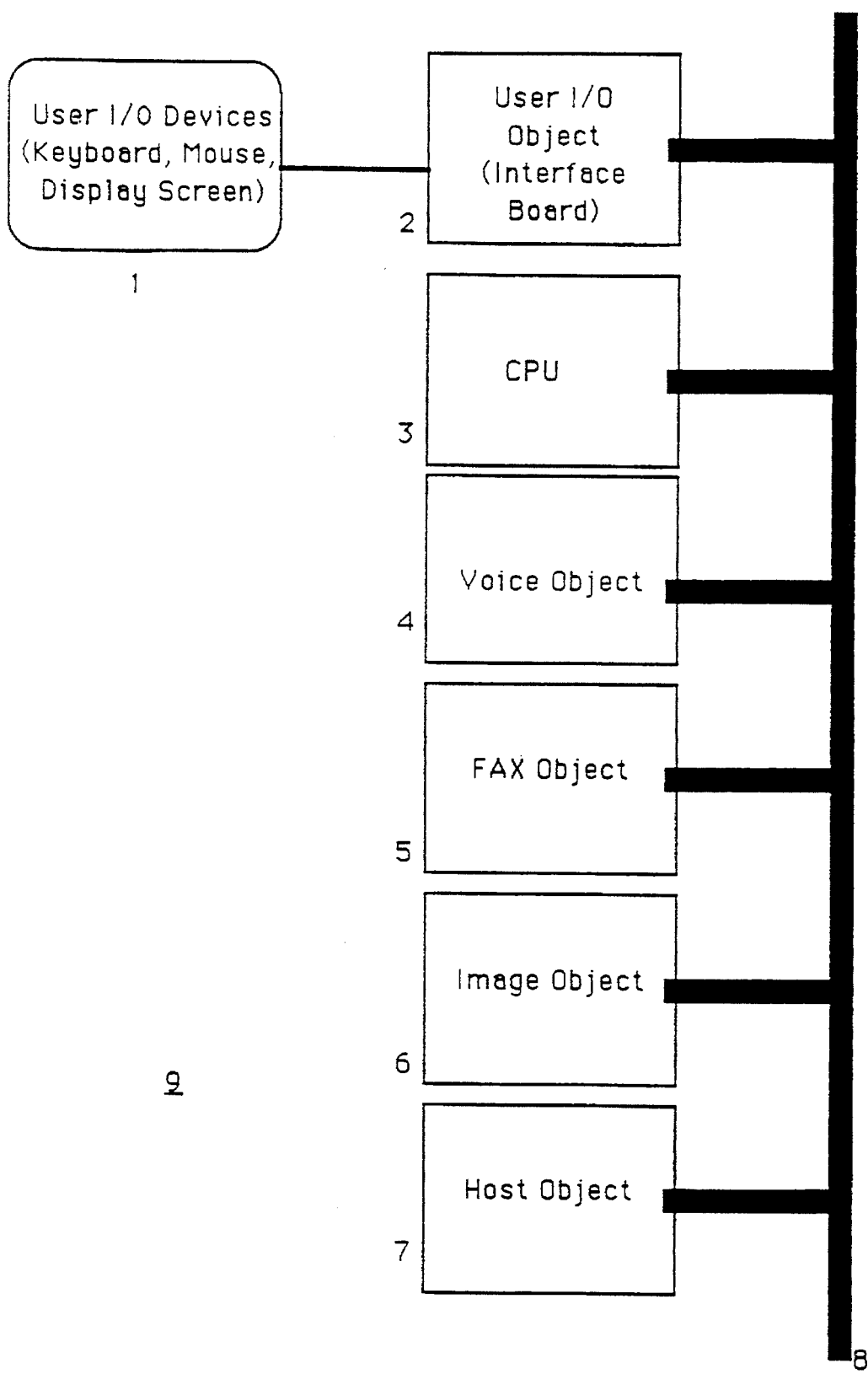
FIG. 1 is a block diagram physical description of the environment within which the preferred embodiment operates.

Referring now to FIG. 1, there is shown a computer-controlled customer information exchange system 9 in accordance with the present invention. The system permits a customer to telephone a business to get voice or facsimile information without human intervention. In accordance with the present invention, the system also permits customers to access business data centers through personal computers or other means. The system is based around a Central Processing Unit (CPU) 3 of conventional design, programmed in the manner described below and connected to a computer bus 8, also of conventional design. While the system can be implemented using any one of several common processor/bus configurations, the preferred embodiment makes use of an 80486 microprocessor commercially available from INTEL Corp. and an Industry Standard Architecture (ISA) PC server bus design. The CPU 3 includes not only the processor chip itself, but associated memory and peripheral components such as read only memory, dynamic random access memory, hard and floppy diskette drives, and the like as commonly are found in small computer systems. Also connected to the bus 8 is a user input output (I/O) interface board 2. This board, which may be physically implemented on a plurality of circuit cards, is in turn conventionally connected to user I/O devices such as a keyboard, a pointing device or "mouse," and a display screen.

Also connected to the bus 8 is a voice object card 4 that interfaces with one or more telephone lines (not shown) to play voice messages stored in the CPU 3 and to receive touch-tone responses from users in telephonic connection with the card. In the preferred embodiment, an industry standard four channel voice card such as those commercially available from Natural Microsystems, Inc. or Dialogic Inc. would be used for the voice object card 4.

A FAX object card 5 is also connected to the bus 8, and communicates with the voice object card to permit the transmission and reception of facsimile documents over telephone lines. The preferred embodiment employs a four channel FAX object card 5 such as those commercially available from Gammalink Inc. or Brooktrout Inc. that allows dynamic switching between voice and facsimile on the same channel as the voice object card 4.

An image object card 6 is also connected to the bus 8 and operates in conjunction with the FAX object card 5 to translate data or text information into images for facsimile transmission. Any image processing card compatible with the bus 8 and the FAX object card 5 can be used for the image object card 6.

A host object card 7, attached to the bus 8, provides connection to one or more corporate computers (not shown) containing corporate information sources. The host object card 7 functions to make the system 9 appear as a user terminal to the corporate computer(s). Interface cards of conventional design may be used as host object cards 7 to provide connection to computers manufactured, for example, by International Business Machines, Hewlett-Packard and Digital Equipment. Connection to less common computers may require custom interface cards, that may be readily designed by those skilled in the art. Other objects may easily be added for existing or future technologies by connecting an appropriate card to the bus 8.

Figure 2:
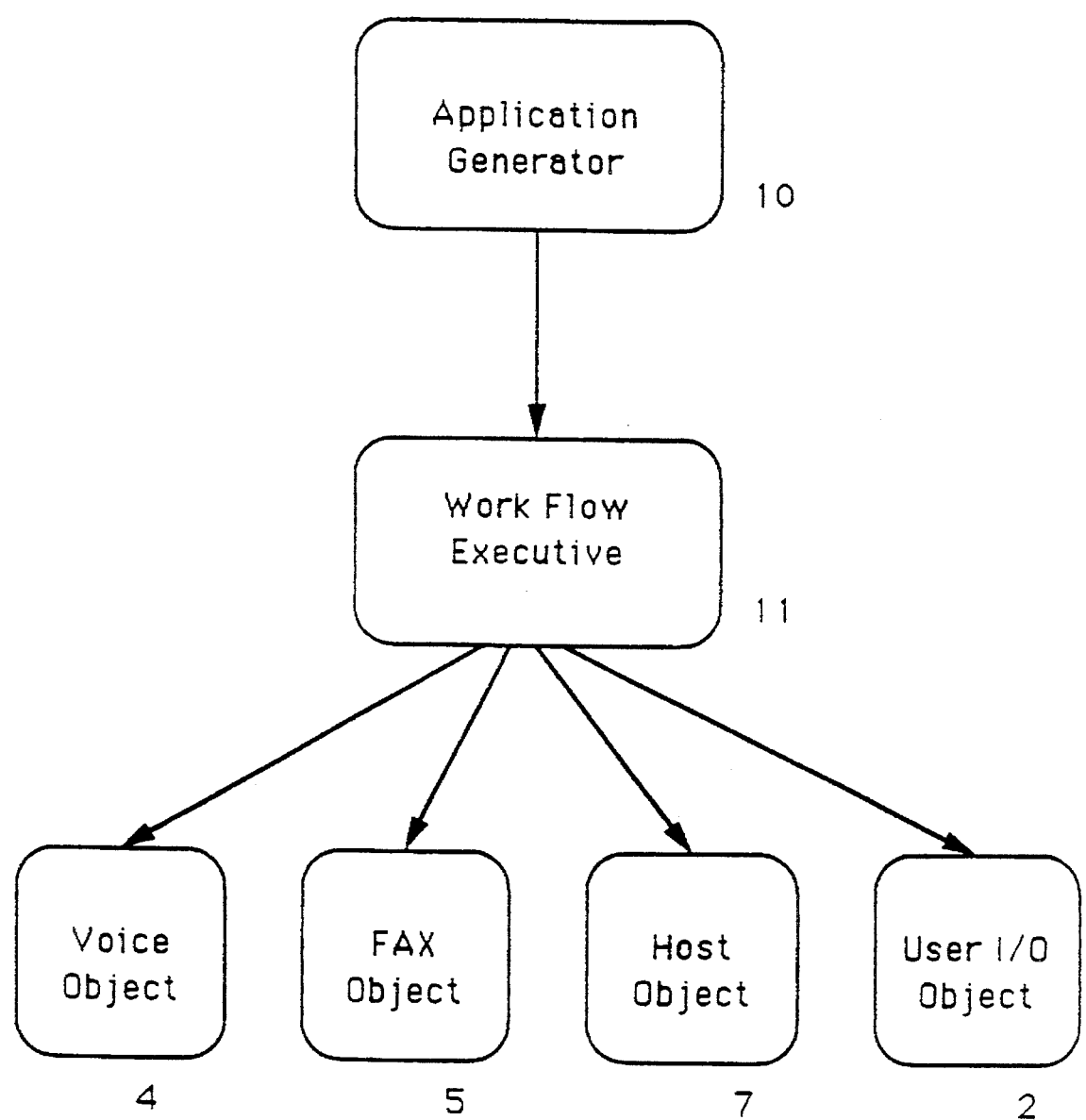
FIG. 2 is a block diagram illustrating the relationship between the application generator, the work flow executive and various objects in accordance with the present invention.

Referring now to FIGS. 1 and 2, there is shown a general overall flow diagram of the operation of the system 9. An application generator 10, implemented by programming the CPU 3, provides a graphical user interface by which an application designer may organize and lay out the office processes that the system 9 is to automate. A work flow executive 11, implemented again by programming the CPU 3, installs and tests the application created by the application generator 10. Once the testing and installation are complete, the work flow executive 11 also controls the execution of the application on the system, executing the step objects of the application and passing data as required from one object to another responsive to such factors as time of day, day of week, receipt of a telephone call, or information from external computers connected to the system 9 via the host object card 8. Such information from external computers could relate, for instance, to the company's order entry or accounting processing.

The work flow executive 11 interfaces with the voice object 4, FAX object 5, host object 7 and user I/O object 2 to perform the tasks defined by the application generator 10. For example, in response to an incoming telephone call, the work flow executive 11 may direct the voice object 4 to answer the phone and to play a message telling the caller what digit to enter for each of a number of services, such as obtaining an account balance. The work flow executive 11 may then direct the voice object 4 to listen for the caller's response and to prompt the caller for an account number. Following that, the work flow executive may pass the account number received from the voice object to the host object 7, along with a request that the host object 7 respond with the balance for that account from a database on a computer communicating with the host object. Once the information is received from the host, the work flow executive may direct the voice object 4 to play a message providing the caller with the account balance. In another example, similar information about an account could be sent to the caller's facsimile machine through the FAX object 5. To provide for human control and supervision should errors appear during a particular task, the work flow executive may also communicate with a system administrator having a terminal or personal computer connected to the user I/O object 2.

Figure 3:
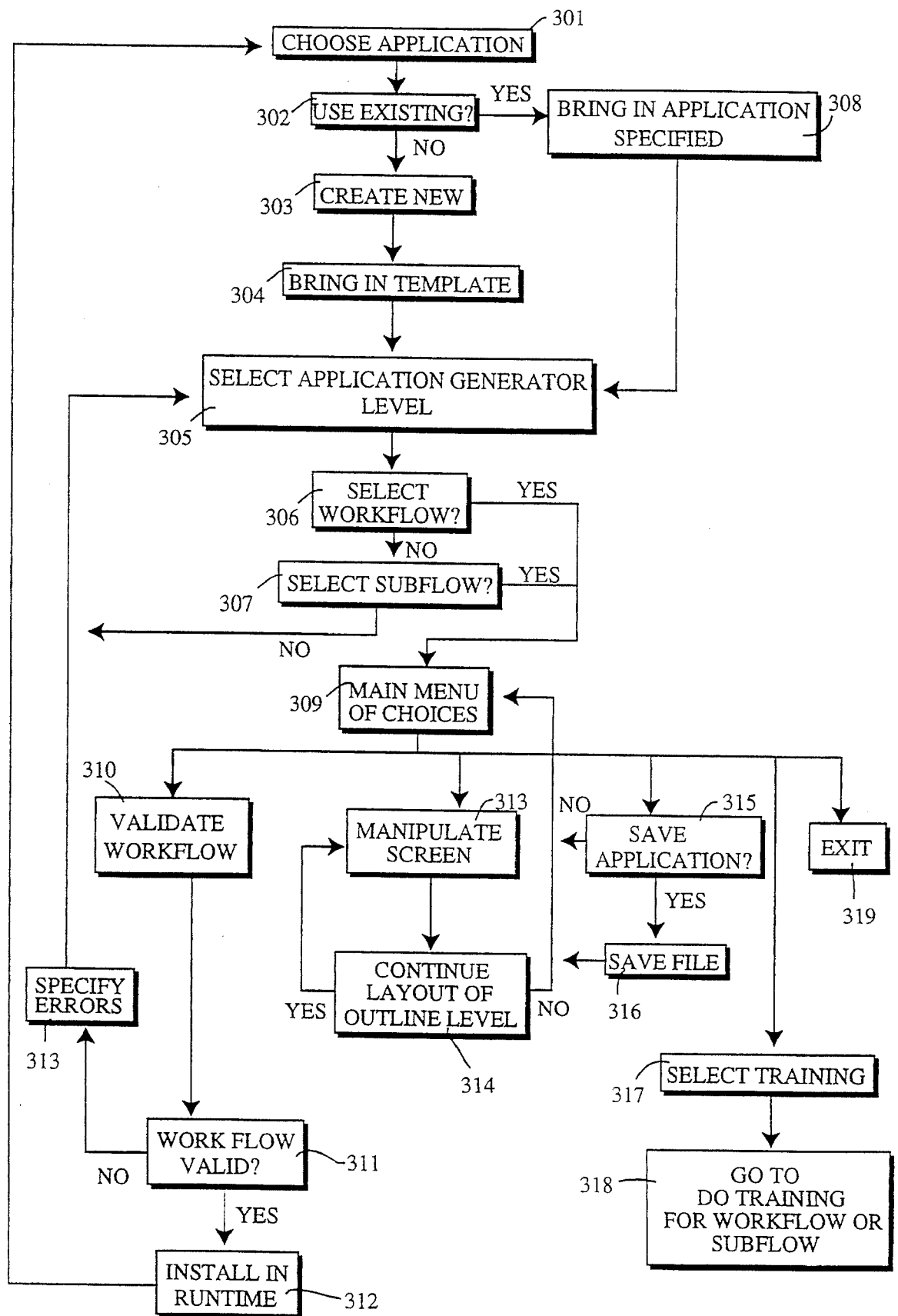
FIG. 3 is a flow diagram illustrating in overview the operation of a system for designing applications in accordance with the present invention.

Referring now to FIG. 3, there is shown a flow diagram illustrating in overview the operation of a system for designing applications in accordance with the present invention. Execution begins by choosing an application in step 301. A check is performed 302 to determine if the application generator 10 is to use an application that already exists. If so, the existing application is retrieved 308. Otherwise, a new application is created 303 and a template to assist in designing the new application is retrieved 304. After steps 304 or 308, the user is then provided 305–307 with a choice of levels on which to work. The workflow level selection 306 is a high level outline of the flow that a user desires for the system to have describing information flow among objects. The subflow level selection 307 specifies the details of each of the steps of a workflow describing information processing within the capabilities of a single object (e.g., create cover and document pages for a facsimile transmission). If neither workflow nor subflow are selected in steps 306–307, execution returns to step 305. If either workflow or subflow are selected 306–307, then execution moves to a main menu of choices 309. From the menu of step 309, the user may select verification of the workflow that was just created, to modify or create the workflow on the display screen using simulation of the real object, e.g., screen display of the host session, save the application, "train" the application by specifying information flow, or exiting. Validation of the work flow begins at step 310. A check is performed 311 to determine whether a work flow is operating properly, or is "valid." If so, the application is installed in runtime version and processing returns to the initial step 301. From the main menu at step 309, the user may choose to manipulate the workflow on the display screen in steps 313 and 314. Steps 315 and 316 allow the user to save the current application as a file. Steps 317 and 318 allow the user to "train" an object by providing actual processing details. Step 319 permits the user to exit the application generator.

Figure 4:
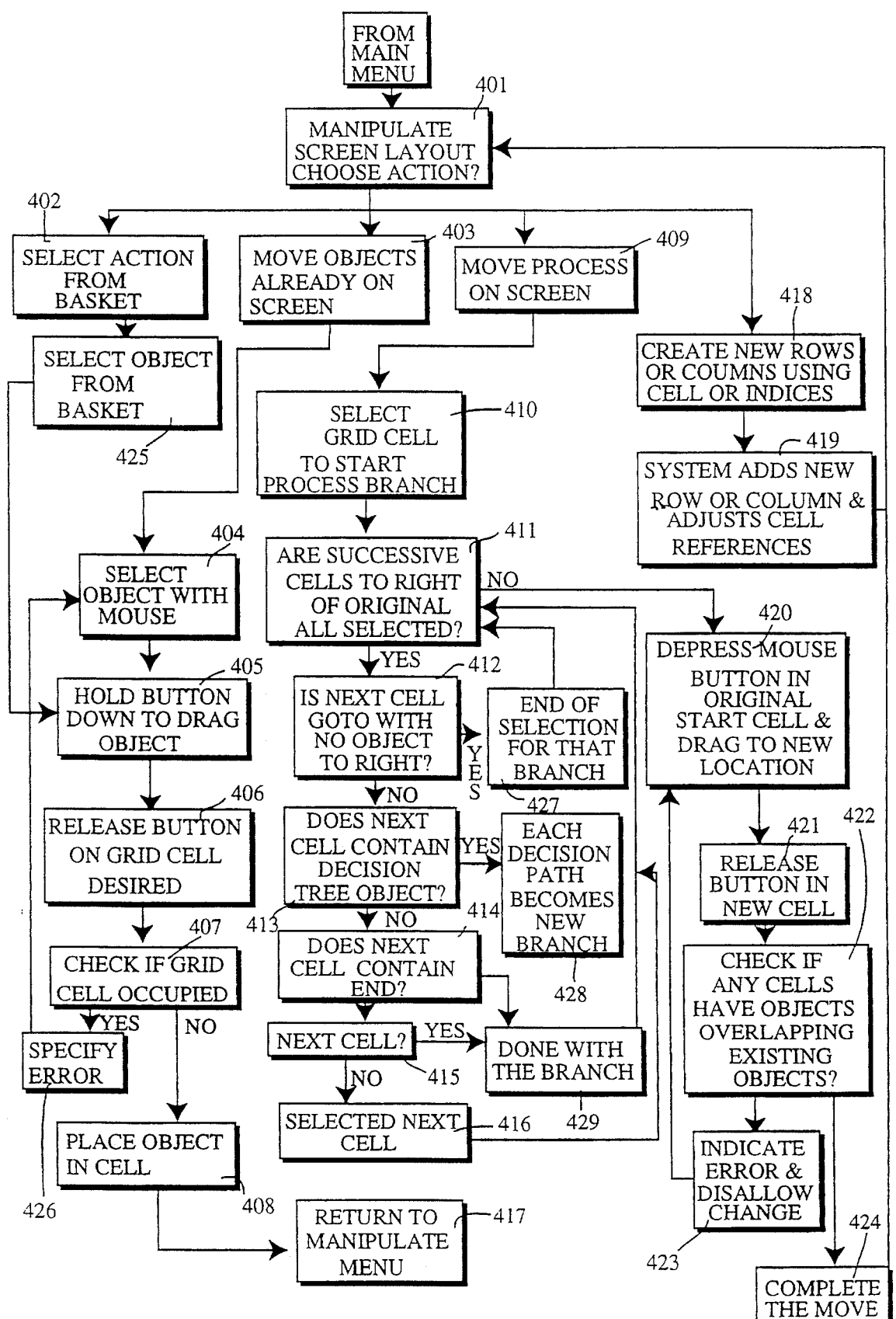
FIG. 4 is a flow diagram illustrating in greater detail the screen manipulation functionality disclosed in FIG. 3.
Figure 11:
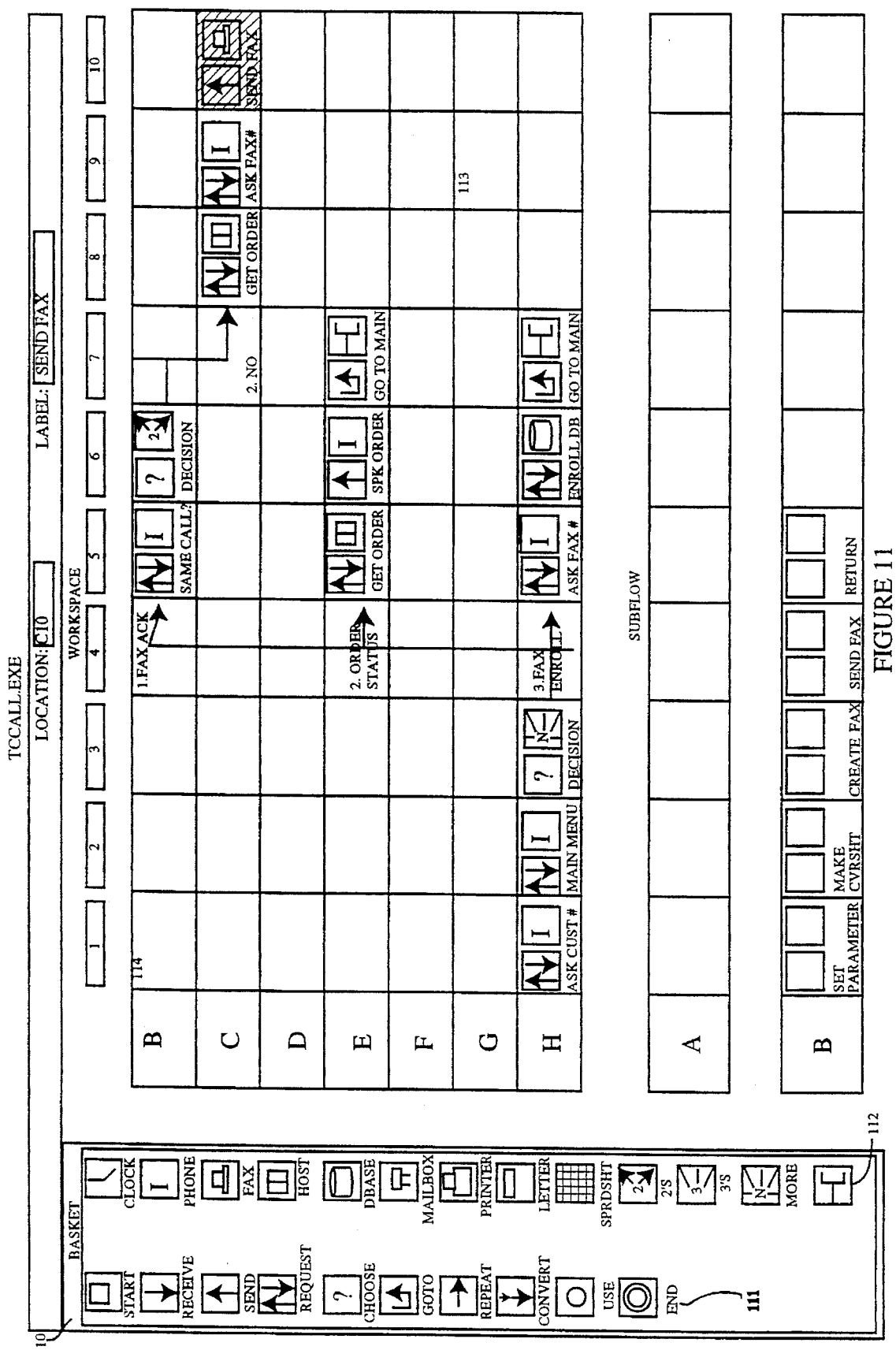
FIG. 11 is a sample screen illustrating the user interface for application design in accordance with the present invention.

Referring now to FIGS. 4 and 11, greater detail is provided regarding display screen manipulation as discussed above in connection with steps 313 and 314 of FIG. 3. With display screen manipulation, an application designer may graphically select actions 111 and objects 112 from a displayed collection, or 'basket' 110, arrange them as required on a grid 113 of cells 114 to change design decisions originally made or to fix errors in designs. In accordance with the present invention, one direction on the grid represents the ordered progression of steps to be executed by the system, and the other direction displays conditional alternatives or choices resulting from user response to prompts. In the preferred embodiment, the horizontal direction toward the right is used for the progression of steps, and the downward vertical direction is used for conditionals. Applications are graphically manipulated and represented on the display screen in any of three ways that are continuously selectable by the designer. The ordered tasks that an application directs the system to execute is described as the "workflow" of the application. The main workflow, or "mainflow" of an application may be manipulated or shown to provide the designer with an outline view of the application being designed, the subflows comprising a mainflow may be manipulated or shown in somewhat greater detail than the mainflow, and the training details for subflows or mainflows may be manipulated or shown to provide the greatest detail. To facilitate graphical manipulation of workflows, feedback paths are not shown as such, but are illustrated as GOTO, END or RETURN steps. Not displaying the feedback paths removes the clutter from the primary flow in the display. In addition, selection of the primary flow for manipulation such as repositioning the flow on the grid 113 is now possible since it is distinguishable from the feedback paths through the explicit designation of such paths and through the convention that primary paths follow a horizontal left to right convention in laying such paths out. Step 401 provides the designer with several screen manipulation choices. If the designer desires to build a new task, the designer may select actions and objects from their respective baskets in steps 402 and 425. Objects are registered with the application generator 10 so that when it is called upon to do so, each can display the subflows, training, icons and actions associated with it. In order to reduce the permutation of choices confronting an application designer having available N actions with M objects, steps 402 and 425 present these choices sequentially, with available objects 112 being selectable only after the designer has chosen an action 111. This results in the display of N actions plus M objects, rather than N*M action-object selections if all options were simultaneously displayed. If the designer wishes to operate on an object already on the display screen, it may be selected through steps 403 and 404. After selecting an object in either step 425 or 404, the designer may drag the selected object 405 and 406 to a new location on the grid 113 using a pointing device or "mouse" connected in a conventional manner to operate on the system. This allows the designer to easily manipulate flow "trees" on the display screen by moving portions, or "branches," in order to create more space for additional steps or to change functionality. Once the object is repositioned as displayed, a check is made 407 to determine if that cell on the displayed grid to which the object has been moved is not already occupied. The use of the grid approach makes this straightforward and superior to a freeform approach. If it is not, the object is placed 408 in the cell. Otherwise, the error that has occurred is specified 426 and execution returns to step 404. After step 408, execution returns 417 to the manipulate menu of step 401.

Instead of operating on an isolated object, the designer may decide from the manipulate menu 401 to move a process on the display screen (or concatenation of cells on the screen previously laid out). If so, the grid cell that begins the process the designer wishes to manipulate is selected 409–411, and a check is performed to determine if all flow branches located to the right of the originally selected cell are completely selected including multiple branches of the original flow caused by conditional cells with outcomes through a termination cell such as a GOTO or END cell. Once all cells are selected, the designer may drag the selection to its new location 420–424, check to make sure that none of the moved cells improperly overlap existing cells, and complete the move once such conflicts are resolved, thereafter returning processing to the main manipulation menu at step 401. If, on the other hand, at step 411 all of the successive cells to the right of the originally selected cell have not been selected, then a check is made to determine if the next cell is a GO TO cell with no object to the right. If so, execution goes to step 427, indicating that this is the end of selection for that branch, and execution returns to step 411. Otherwise, a check is made to determine whether the next cell contains a decision tree object. If so, step 428 creates a new branch of each decision path and returns execution to step 411. Otherwise, step 414 checks to see if the next cell contains an end. If so, step 429 indicates that processing in this branch is done, and execution returns to step 411. Otherwise, the next cell is selected, the checking procedure continues for that cell from step 411 until all cells have been identified and selected.

The main manipulate menu of step 401 also allows the user to create new rows or columns to provide additional space for moving and adding functions to the workflow. New rows or columns may be created 418, 419 using cells or indices, added to the existing system, cell references may be adjusted accordingly, and execution may then return once again to step 401.

Figure 5:
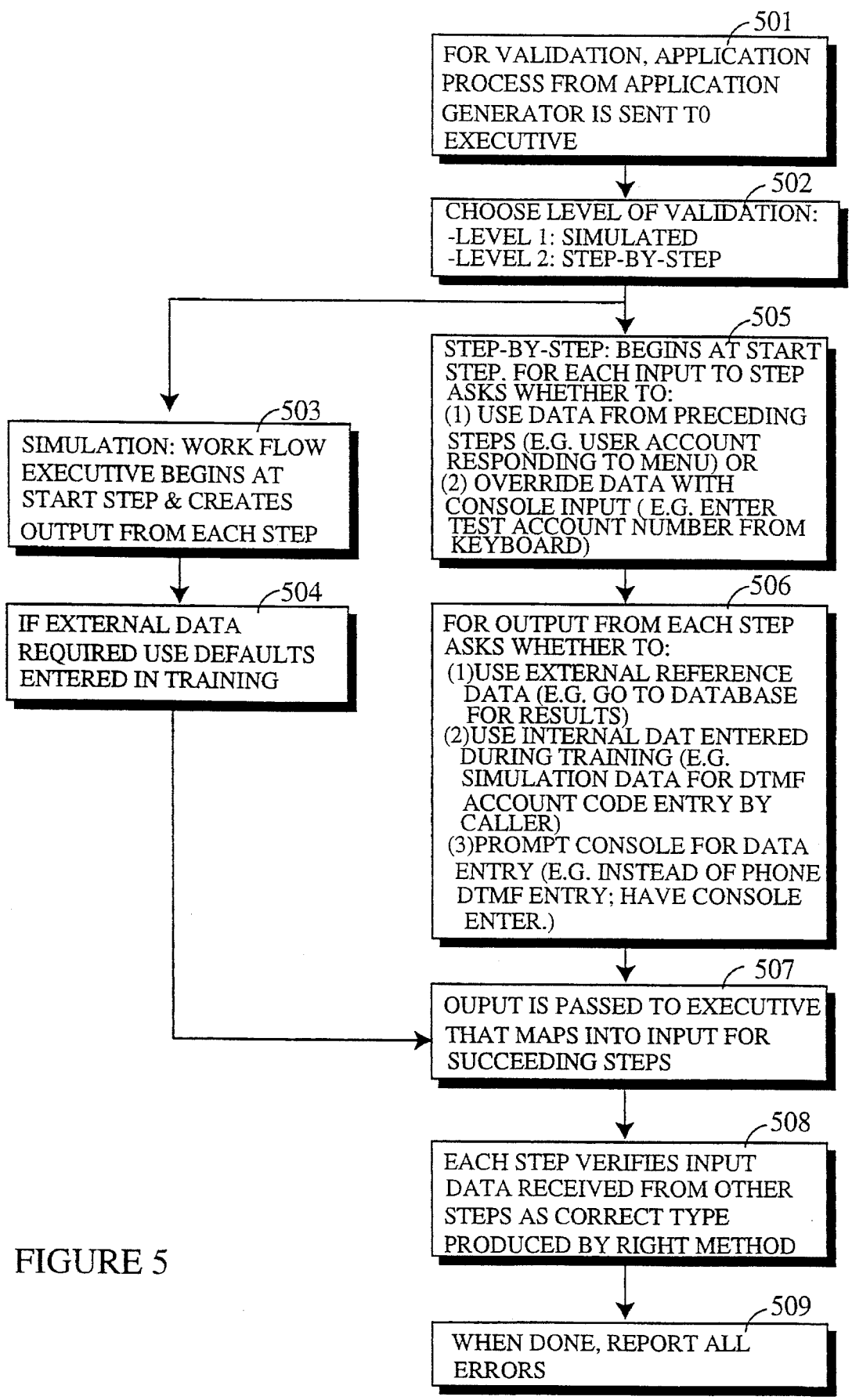
FIG. 5 is a flow diagram illustrating in greater detail the validation functionality disclosed in FIG. 3.

Referring now to FIG. 5, there is shown in greater detail the validation process discussed in connection with steps 310–313 of FIG. 3. Validation begins in step 501 by sending the application process from the application generator 10 of FIG. 2 to the work flow executive 11 of FIG. 2. The user may choose 502 whether to simulate the process flow or to go through it step by step. If the user chooses simulation 503, the work flow executive 11 directs the beginning of execution at the starting step and creates output from each executed step. Validation in simulation mode does not use actual devices for testing, so user supplied default values are processed 504 for external data that would be expected during actual system operation. The output 507 from the executive for each processing step is passed as input for succeeding processing steps. The data received from other processing steps is verified 508 as being of the correct type and produced by the correct method, and any errors are reported 509. Should the user at step 502 choose step-by-step validation, the application process is executed 505, 506 one step at a time using actual physical external resources (e.g., phone, terminal), and for each step, the user is prompted either to use data from preceding steps or to continue processing with data entered by the user from the keyboard or some other source, such as the object being validated. Processing then continues 507, as previously described.

Figure 6:
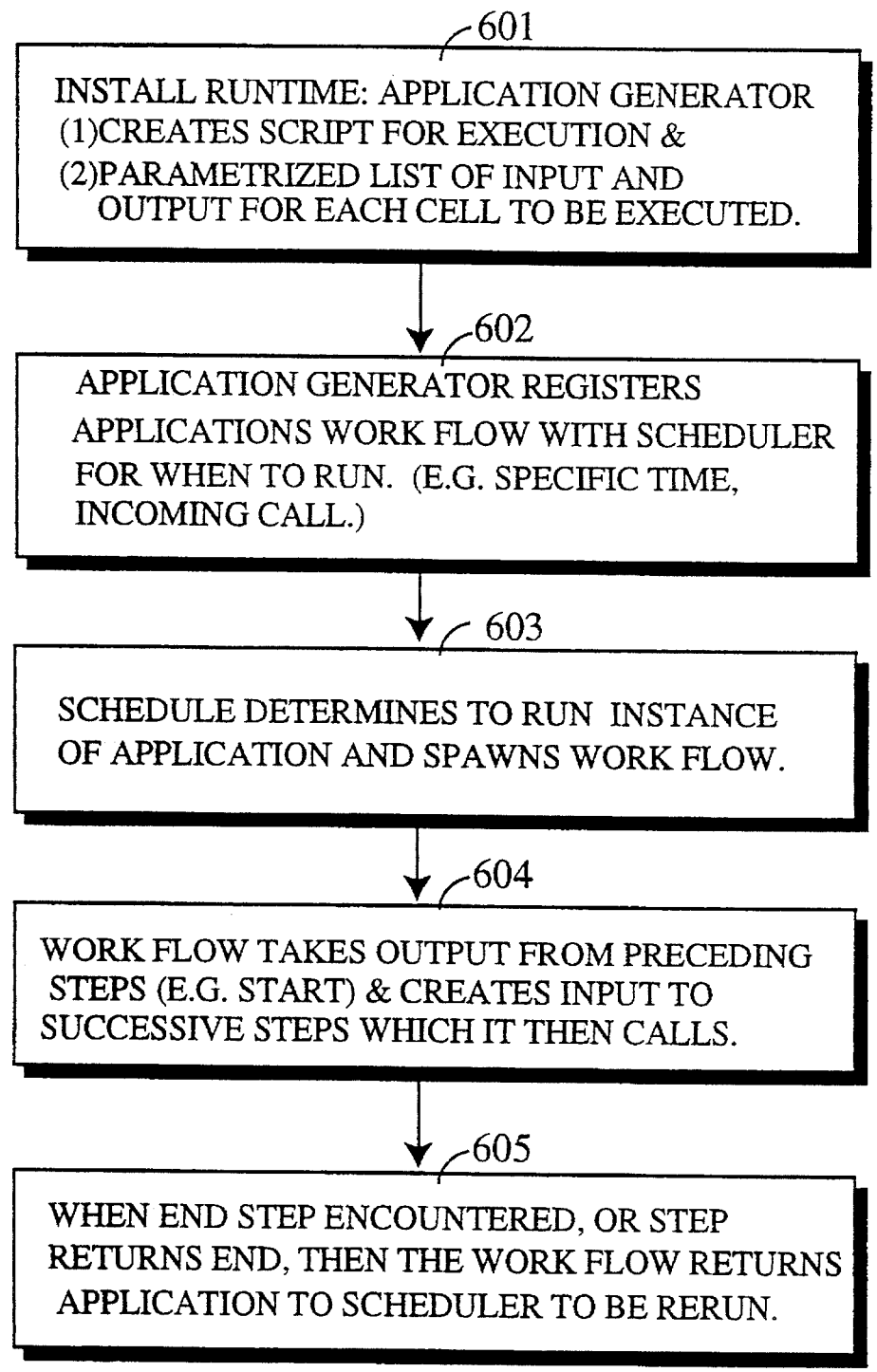
FIG. 6 is a flow diagram illustrating how applications are installed in the runtime environment in accordance with the present invention.

Referring now to FIG. 6, there is shown in greater detail the installation of an application in the runtime environment mentioned in connection with step 312 of FIG. 3. The runtime installation begins 601 by directing the application generator 10 of FIG. 2 to create an executable script and parameterized list of input and output for each processing cell to be executed. The application generator is then directed 602 to register the work flow of the application with a "scheduler" portion of the work flow executive 11 to specify the condition or conditions triggering execution of portions of the work flow. For example, a portion of the work flow may be to respond to incoming telephone calls in a predetermined way, and the scheduler may be set to execute an instance of that work flow portion whenever an incoming call is detected on any one of several incoming lines. The scheduler determines 603 that an instance of an application is to be run and begins a work flow. The work flow executive transmits output 604 from preceding steps as input to subsequent steps that it calls. Upon encountering an END statement, or a step that returns an END statement, the instance of the application is finished executing, so it is reset and made available to the scheduler once again for future use.

Figure 7:
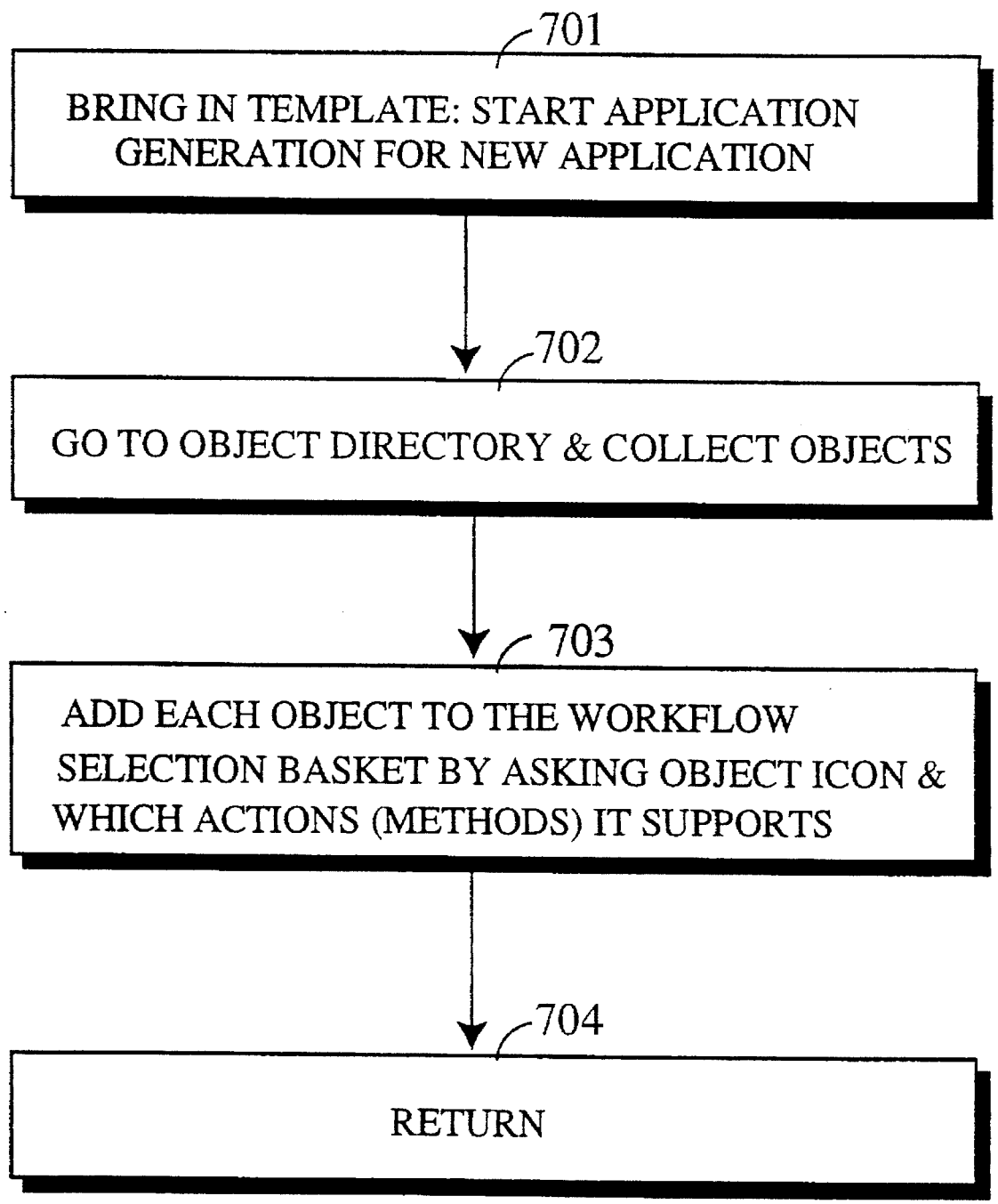
FIG. 7 is a flow diagram illustrating how templates can be added to include new forms of objects to the system in accordance with the present invention.

Referring now to FIG. 7 there is shown in greater detail the capability of using templates mentioned in connection with step 304 of FIG. 3. Templates provide the capability to expand operation of the system to include new forms of objects that work within the defined set of actions and methods for displaying the object in the workflow and subflow as well as creating training windows for physical device manipulation as required. Processing to bring in a template begins with steps 701–702, in which the application generation for a new application commences and all existing objects are collected from an object directory. Each object is made available 703 to the workflow selection basket by specifying the icon and supported actions associated with the object. Processing then returns 704 to the place from which step 701 was called.

Figure 8:
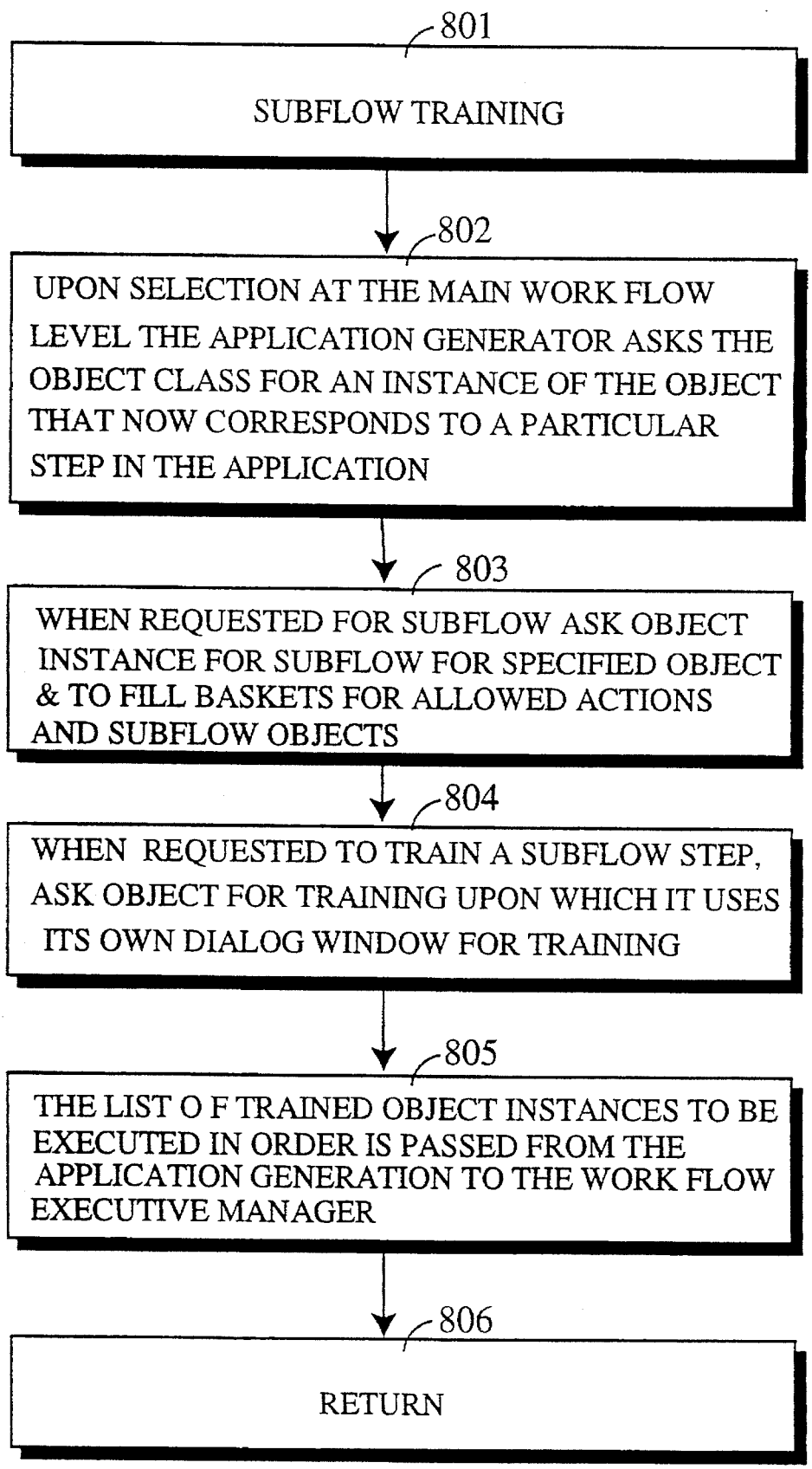
FIG. 8 is a flow diagram illustrating how subflows can be trained in accordance with the present invention.

Referring now to FIG. 8, there is shown greater detail on the subflow training facility introduced in connection with step 318 of FIG. 3. Training begins 801 as the application generator 10 of FIG. 3 requests 802 an instance of an object from an object class, the instance corresponding to a particular step in the application. This is done by dragging the action-object cell from the step basket to the workspace. The subflow for the selected object instance referred to in a mainflow cell is obtained 803 by selecting the cell in the mainflow, along with the allowed actions and subflow objects for creating or modifying the subflow. Selecting a specific cell in the subflow containing an action/object pair invokes the training for that cell in the subflow step, and the object is requested 804 to provide a dialog window associated with training for the object. Then, each trained object corresponding to a cell in the original mainflow will be available for execution when passed 805 from the application generator 10 to the work flow executive 11. Execution then returns 806 to the processing that originally called the subflow training 801.

Figure 9:
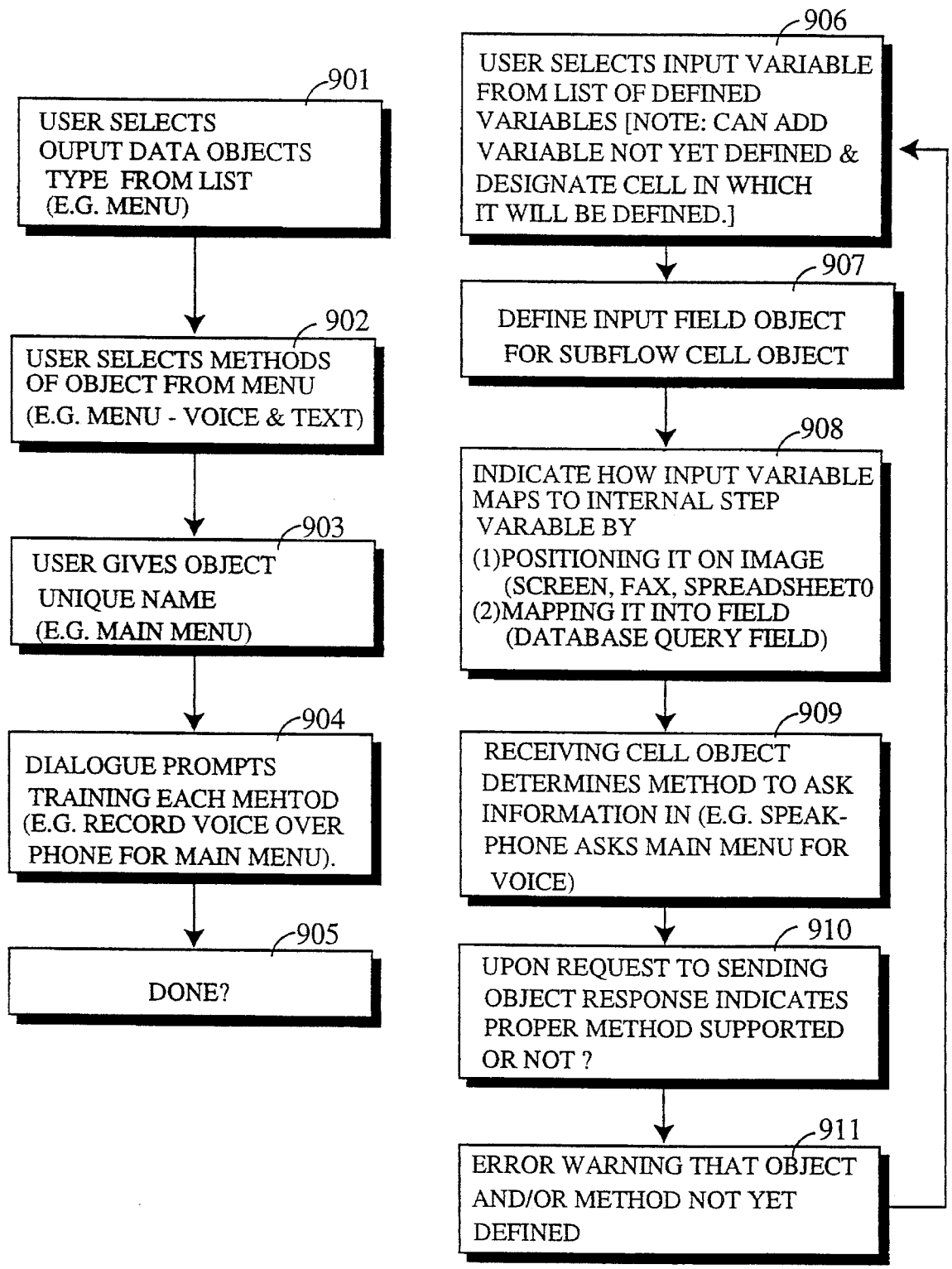
FIG. 9 is a set of flow diagrams illustrating how data input and output for subflow steps is accomplished in accordance with the present invention.

Referring now to FIG. 9 the facilities for training the data input and output related to subflow steps are shown. These facilities allow mapping of internal object data from one object to another so that data from one subflow can be used in the remainder of the workflow. On the output side, the user selects 901 an output data object, such as an icon representing a menu, from a list of available objects. The user selects 902 methods to be associated with the chosen object, and gives the object an identifying name 903. Each method is trained 904 by specifying for the information required (e.g., where a received account number variable need be located on a host's computer screen to access a customer's account information) and a check is made 905 to determine whether the training is completed. Any methods that require further training are listed so that the designer may train them. On the input side, the user selects 906 an input variable from a list of defined variables or from a designated cell in which the variable is to be defined. An input field object for the cell flow object is defined 907 908 and the user maps the input variable to an internal step variable. For example, the account number is positioned on the screen of a host session at an appropriate place by mapping it into the host data string field. The cell of the object that is to receive the data requests the information in step 909, and the workflow executive checks 910 with the sending object to determine whether the required information is available. If the object or information required is not properly defined, a warning is issued 911 and execution returns 906.

Figure 10:
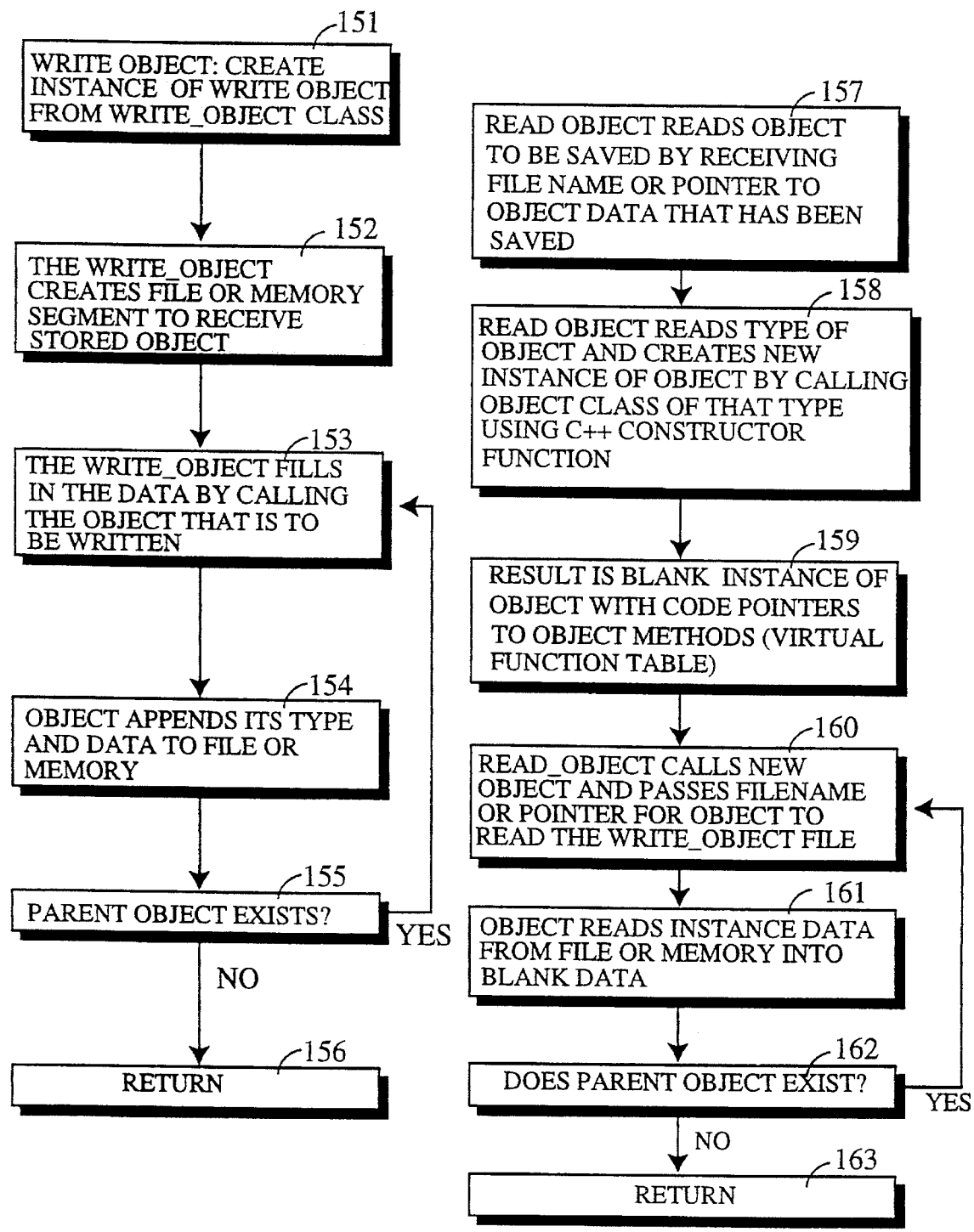
FIG. 10 is a set of flow diagrams illustrating how objects are written and read to disk for permanent storage in accordance with the present invention.

Referring now to FIG. 10, the information being passed between step objects by the workflow executive 11 of FIG. 2 may itself consist of objects, i.e., data and code capable of executing functions on the data. For example, the information being passed may be an object consisting of a voice message recorded at 24 kilobits per second along with code for converting the message into a 64 kilobits per second format for play over an industry standard ISDN network. Other voice objects could include data from messages recorded at other rates but might all have code for conversion to 64 kilobit per second format. This permits a device directed to transmit such message objects to do so regardless of how each message was recorded by simply requesting each message object to play itself in the 64 kilobits per second format. Since objects frequently are sent from device to device within the system, facilities are provided for writing and reading objects as needed by the application generator 10 and work flow executive 11 of FIG. 3. When applications are created or modified and then saved, it is redundant and inefficient to read or write all of the data and code associated with each instance of an object. Furthermore, code pointers shared among objects in one device may not be valid on another device. Since only the data is unique to each instance of an object, the facilities illustrated in FIG. 10 take advantage of this characteristic. The inheritance of methods in the C++ object oriented programming language is defined in a virtual function table consisting of code pointers to executable code representations of methods, associated either with the object itself or with a parent. The virtual function tables and the data of an object define the object. In order to pass an instance of an object to another node on a computer network or to store the object on a disk, information linking both the code reference by the virtual function table and the data for that instance must be maintained. In accordance with the present invention, the object is instructed to write itself to a WRITE OBJECT file by writing its own object type and data to the file, and instructing its parents to do the same. Specifically, in writing objects, step 151 first creates an instance of a file by calling a WRITE_OBJECT to do this. Then, in step 152, the WRITE_OBJECT calls the object being written to fill in the type of object and the data by executing its WRITE_OBJECT method. In steps 153–155, the executing cell requests that the object write the type and data associated with the object to a file, and iteratively calls upon its parents to do the same so that any inherited methods are also passed on. Finally, when there are no further parent objects, execution is returned through step 156 to the calling procedure.

To read a file object, a READ_OBJECT method is called and passed the READ_OBJECT file name. The READ_OBJECT reads the object type and creates a blank copy of the object using the conventional C++ compiler constructor function with a valid virtual function table but blank data area. The READ_OBJECT by this means creates a new instance of the object based on its type and creates a new virtual function table associated with the object according to C++ convention. The new instance of the object is then requested to read the READ-OBJECT file to reestablish the original instance data, and the parents of the instance are iteratively called upon to do the same. Specifically, as shown in FIG. 10, processing begins at step 157, with a cell reading an object by receiving a file name for the object. In steps 158–159, the cell reads the type of the object and creates a new instance of the object by referring to the object class, yielding a blank instance of the object having code pointers to the methods of the object class. The cell in steps 160–163 iteratively calls the new object and its parents to obtain data that was placed in the WRITE_OBJECT file when the object was written, and reads instance data into BLANK data for the instance and all of its parents. Once the information from all parents has been obtained, step 163 returns processing to the calling procedure.

Figure 12:
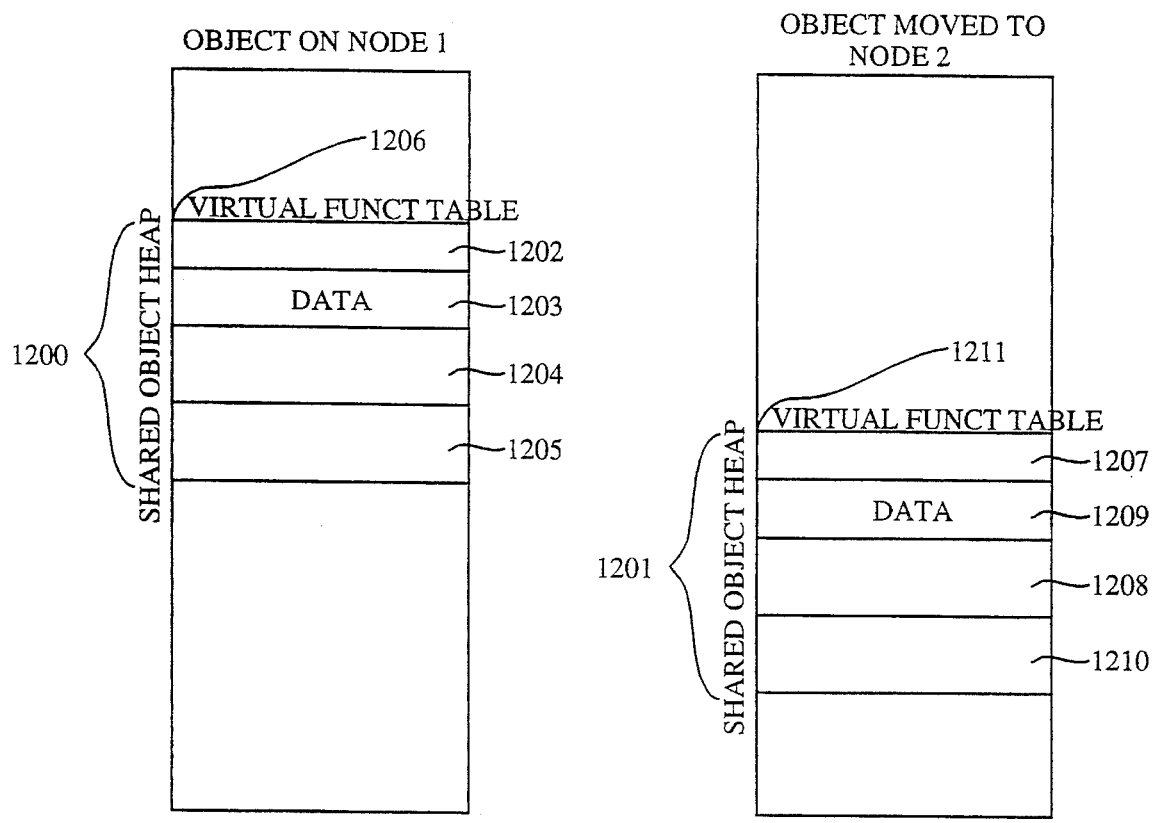
FIG. 12 is a set of memory maps showing how objects can be sent across a network to another node and reconstructed.
Figure 13:
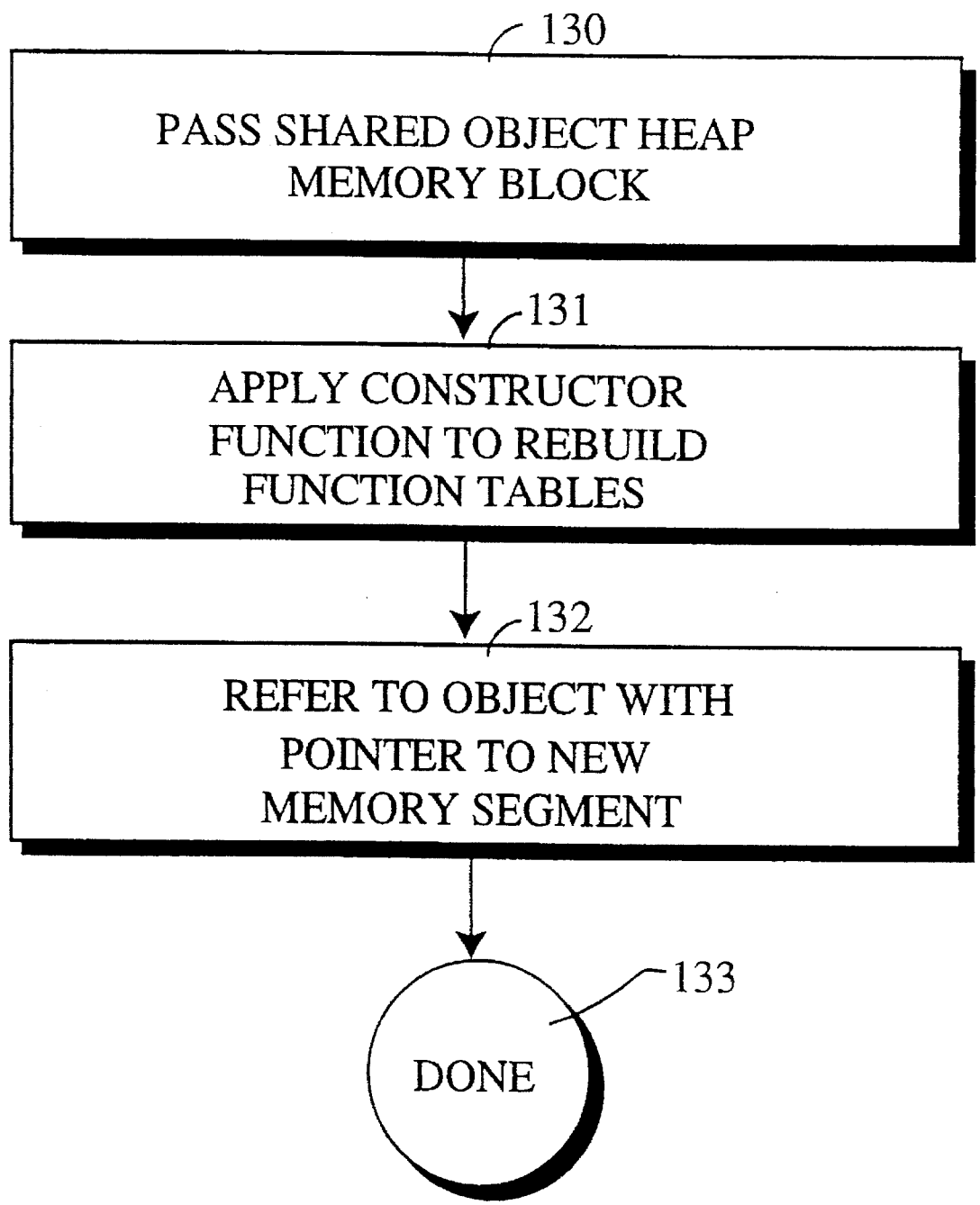
FIG. 13 is a set of flow diagrams illustrating how objects are sent to another node in a network in accordance with the present invention.

For passing objects between nodes on a network where small storage size is not as important as real time processing efficiency, an alternative approach is used as illustrated in FIGS. 12 and 13. In the case referred to in FIG. 12, the data (items 1203 and 1205 in node 1 and 1209 and 1210 in node 2) along with the virtual function tables of the object and its parents (1202 and 1204 in node 1 and 1207 and 1208 in node 2) are stored in a shared object heap for any instance of an object. Relative addressing within the shared object heap preserves the addressing capability wherever the memory segment containing the object appears. The only item needed to refer to the object is the initial pointer to the memory segment containing the virtual function table and data item offsets (1206 in node 1 and 1211 in node 2). This pointer is typically that used to identify an object in C++ in a program. To pass the object to another node on a network, the shared object heap (as a block of memory referred to in FIG. 12 as 1200) is passed over the network and placed in a memory segment in another node (referred to as 1201) starting at a specified memory pointer location (item 1211). The C++ reconstructor function is called to rebuild the virtual function tables that contain code pointers to actual code for the object methods (code is not passed between nodes and therefore new addresses for code entry points must be built). All that is needed to refer to the new object is to give the pointer to the new memory segment for that instance of the object (item 1211).

FIG. 13 diagrams the flow in sending an object across the network. The shared object heap is passed as a block of memory (130). When received the virtual function tables are rebuilt by applying the standard C++ constructor function (item 131). Now the new object can be referred to using the new pointer to the resulting memory segment (item 132), and the transfer ends with step 133.

Therefore, a system and method for facilitating efficient exchange of information between a business and customers is controlled by an application designed using object oriented techniques.

What is claimed is:

1. An information exchange system comprising:
   an application generator implemented on a computer to create an application for execution on said computer, to implement a select interaction of a plurality of devices, said application generator providing an object oriented user interface in which each of said plurality of devices is graphically represented on a display as an instance of an object, and positioning said instances adjacently to each other on said display implements said predetermined interaction; and
   an object oriented work flow executive implemented on said computer for installing and executing said application on said computer to direct the operation of said plurality of devices responsive to said application, wherein said information exchange system further comprises a grid of cells, each cell adapted to carry a single step object and to enable linkage between said single step object and at least a single adjacent step object, said application comprises a first plurality of step objects sequentially ordered in time in successive cells and a second plurality of step objects each providing an alternative next step for a selected one of said first plurality of step objects; and wherein said user interface positions said first plurality of step objects along a first axis of successive cells and at least one of said second plurality of step objects in placed in a cell offset from said first axis.

2. An information exchange system as in claim 1, wherein said first plurality of step objects is horizontally oriented in successive cells on said display and said second plurality of step objects is vertically oriented in selected cells at least one of which is offset from the first axis of successive cells on said display.

3. An information exchange system as in claim 1, further characterized in that each of said plurality of objects is associated with a subset of a plurality of actions, and in that said user interface first displays said plurality of actions for selection, and second, responsive to selection of one of said plurality of actions, presents a subset of said plurality of objects responsive to the association of each of said plurality of objects with said selected action.

4. An information exchange system as in claim 1, wherein said application generator is adapted to define a grid of cells on said display; to allow association of each of said instances with a corresponding one of said cells; to allow selection of one of said plurality of instances sequentially superior and adjacent to a subset of said plurality of instances for which, repositioning is desired; to reposition said subset responsive to a grouping of said one instance with said subset of instances and repositioning said one instance; and to generate an error signal responsive to overlap of said grouping with said plurality of instances.

5. An information exchange system as in claim 1, wherein a feedback relationship between two step objects is represented by a GOTO step object.

6. An information exchange system as in claim 1, wherein a feedback relationship between two step objects is represented by a RETURN step object.

7. An information exchange system as in claim 1, wherein said work flow executive generates an error message responsive to positioning of said instances to cause interaction of said objects in one of a plurality of predetermined improper manners.

8. An information exchange system as in claim 7, wherein said plurality of predetermined improper manners includes a manner in which information is transmitted from a first object to a second object, said information being incompatible for use with said second object.

9. A method of organizing and manipulating a plurality of temporally and conditionally related, selectable objects, with an application generator and an object oriented work flow executive, the application generator implemented on a computer to create a selected application and provide an object oriented user interface including a grid of cells in which a plurality of selected devices are graphically represented on a display as object instances, each cell adapted to carry a single step object and to enable linkage between said single step object and at least a single adjacent step object, comprising the steps of:

placing a first subset of said plurality of selectable objects in temporal order along successive cells a long a first axis;

placing a second subset of said plurality of said selectable objects in selected cells along a second axis; and installing and executing the application on the computer to direct the operation of said plurality of devices responsive to said application.

10. A method as in claim 9, wherein said first axis comprises cells which are orthogonal to said second axis and said second axis comprises cells carrying alternative step objects for user-selected choices.

11. A method as in in claim 9, further comprising the step of manipulating one of said plurality of objects by changing the conditional relation of said one object responsive to repositioning said object along said second axis.

* * * * *